(12) United States Patent
Ogino et al.

(10) Patent No.: US 6,205,399 B1
(45) Date of Patent: Mar. 20, 2001

(54) POSITION RECOGNITION DEVICE

(75) Inventors: Toshikazu Ogino; Takayuki Kurokawa, both of Atsugi (JP)

(73) Assignee: Mitsumi Electric Co., Ltd., Tokyo (JP)

(*) Notice: Subject to any disclaimer, the term of this patent is extended or adjusted under 35 U.S.C. 154(b) by 0 days.

(21) Appl. No.: 09/256,828

(22) Filed: Feb. 24, 1999

(30) Foreign Application Priority Data

Mar. 2, 1998 (JP) .................................. 10-049729

(51) Int. Cl.$^7$ .......................... G01C 21/00; G09B 29/10
(52) U.S. Cl. ......................... 701/213; 701/211; 340/996
(58) Field of Search .................................. 701/207, 210, 701/211, 213; 340/990, 995, 996

(56) References Cited

U.S. PATENT DOCUMENTS

| | | | |
|---|---|---|---|
| 5,170,164 | * 12/1992 | Lewis | 340/988 |
| 5,535,125 | * 7/1996 | Okabe | 701/207 |
| 5,710,600 | * 1/1998 | Ishii et al. | 347/563 |
| 6,012,028 | * 1/2000 | Kubota et al. | 704/260 |
| 6,064,323 | * 5/2000 | Ishii et al. | 340/995 |

* cited by examiner

Primary Examiner—Tan Nguyen
(74) Attorney, Agent, or Firm—Ladas & Parry

(57) ABSTRACT

A position recognition device that outputs data according to a position has a GPS unit for detecting position, an audio input/output unit for inputting and outputting audio and a memory unit for storing data. Audio data as well as corresponding position data are combined, recorded and stored in the memory unit. When a present position as measured by the GPS unit matches position data stored with the audio data, the position recognition device reproduces the audio data corresponding to the position, making it possible to output essential data at the position.

6 Claims, 5 Drawing Sheets

(A)

(B)

(C)

POSITION RECOGNITION DEVICE

BACKGROUND OF THE INVENTION

1. Field of the Invention

The present invention relates generally to a position recognition device, and more particularly, to a position recognition device that outputs data according to a position.

2. Description of the Related Art

As a position recognition device there exists a Global Positioning System (hereinafter GPS). Generally, GPS measures latitude, longitude, elevation, etc., by receiving signals relayed from a plurality of orbiting GPS satellites.

Typically, a position recognition device employing GPS displays measured position data, that is, latitude, longitude, elevation, etc., on a liquid crystal display (hereinafter LCD) in the form of numerical values or in the form of a position displayed at a corresponding position on a map displayed on the LCD, the displayed position being based on the measured position data. This type of position recognition device permits display of symbols denoting post offices and retail stores, etc., on the map displayed on the LCD.

However, the conventional position recognition device is only capable of displaying position data in numerical form or as symbols on a map. As a result, there is a limit to the type of data that can be used as well as the usefulness of the device.

SUMMARY OF THE INVENTION

Accordingly, it is an object of the present invention to provide a position recognition device in which the problems described above are eliminated.

The above-described object of the present invention is achieved by a position recognition device comprising:

means for inputting position data;

means for inputting audio data; and means for recording data, wherein the means for recording data combines and together records the audio data input by the means for inputting audio data and the position data input by the means for inputting position data.

According to the present invention, by combining and together recording audio data and position data, it is possible to obtain additional essential information by reproducing the audio data in accordance with the position.

Additionally, the above-described object of the present invention is also achieved by the position recognition device as described above, wherein the means for inputting position data comprises means for detecting a present position.

According to the present invention, by combining and together storing the input audio data with the present position detected by the position detecting means at the time the audio data are input, it is possible to specify the position at which the audio data was input.

Further, the above-described object of the present invention is also achieved by the position recognition device as described above, wherein the means for detecting position comprises a GPS system.

According to the present invention, by detecting present position by using GPS, it is possible to input present position data accurately.

Additionally, the above-described object of the present invention is also achieved by the position recognition device as described above, wherein the means for recording data records present position data detected by the means for detecting position together with audio data when the audio data is input by the means for inputting audio data.

According to the present invention, because the position data of the position at which the audio data was input is stored, it is possible to ascertain where the audio was recorded when the audio is reproduced.

Further, the above-described object of the present invention is also achieved by the position recognition device as described above, further comprising means for reproducing audio data when present position data detected by the means for detecting position matches the position data recorded together with the audio data by the means for recording data.

According to the present invention, it is possible to obtain data in accordance with the present position by audio by reproducing the audio data when the present position data detected by the means for detecting position matches the position data recorded together with the audio data.

Additionally. the above-described object of the present invention is also achieved by the position recognition device as described above, wherein the means for inputting position data comprises means for displaying the position data.

According to the present invention, by displaying the position and inputting audio, it is possible to reproduce the audio at the previously input predetermined position.

Other objects, features and advantages of the present invention will become more apparent from the following detailed description when read in conjunction with the accompanying drawings.

DESCRIPTION OF THE PREFERRED EMBODIMENTS

A detailed description will now be given of an embodiment of a position recognition device according to the present invention, with reference to FIG. 1 through FIG. 6.

Figure 1:
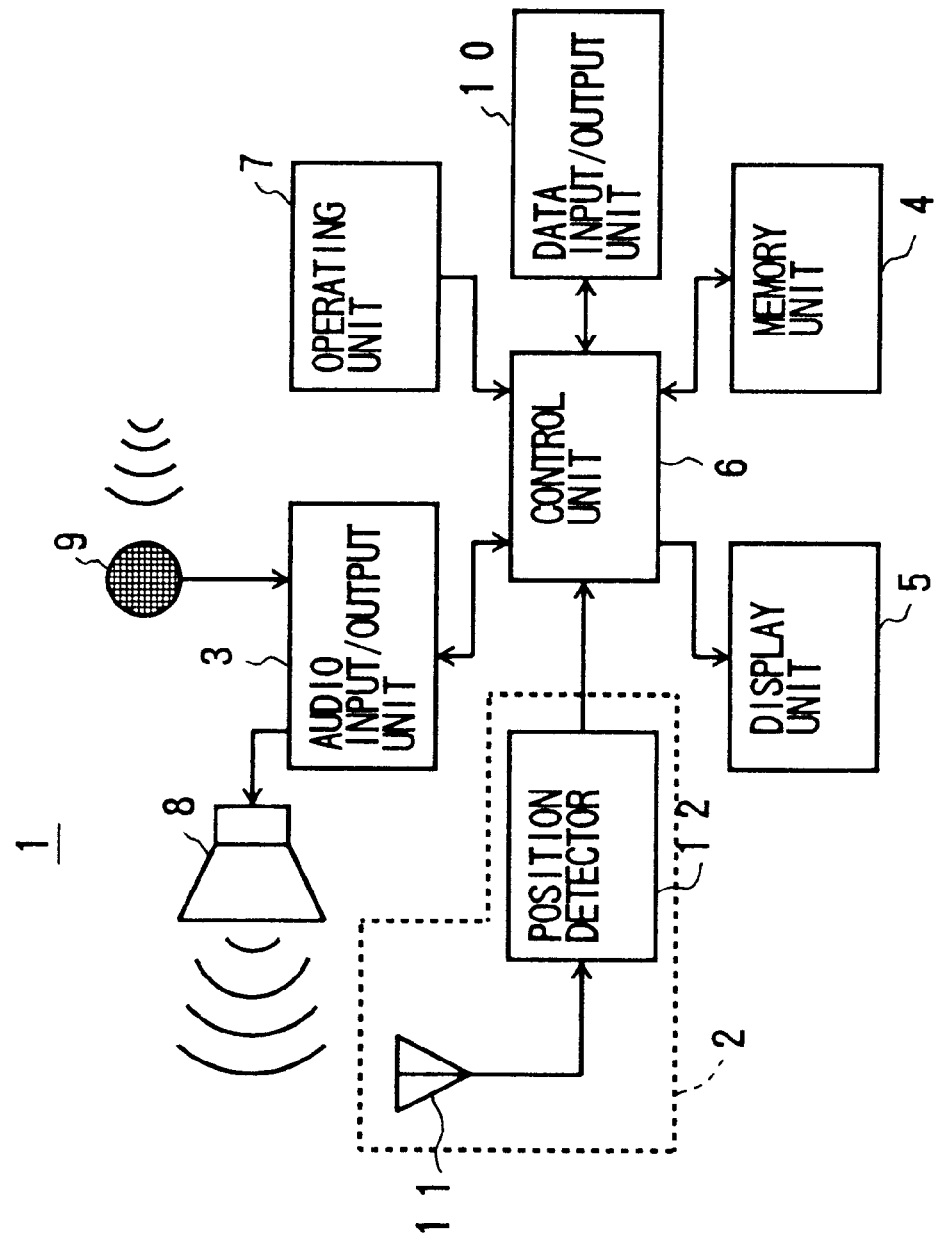
FIG. 1 is a block diagram of an embodiment of the present invention.

FIG. 1 is a block diagram of an embodiment of the present invention. The position recognition device 1 of the present embodiment comprises a GPS unit 2 for detecting present position data, an audio input/output 3 unit for inputting and outputting audio, a memory unit 4 for storing data, a display device 5 for displaying position data, a control unit 6 for controlling the storage of audio data in the memory unit 4, an operating unit 7 for inputting various instructions, a speaker 8 for outputting audio, a microphone 9 for inputting audio and a data input/output unit 10 for inputting and outputting audio data and position data to and from an external device.

The GPS unit 2 receives signals relayed from a plurality of orbiting GPS satellites and detects position data such as latitude, longitude, elevation, etc. The GPS unit 2 comprises an antenna unit 11 and a position detector 12.

Figure 2:
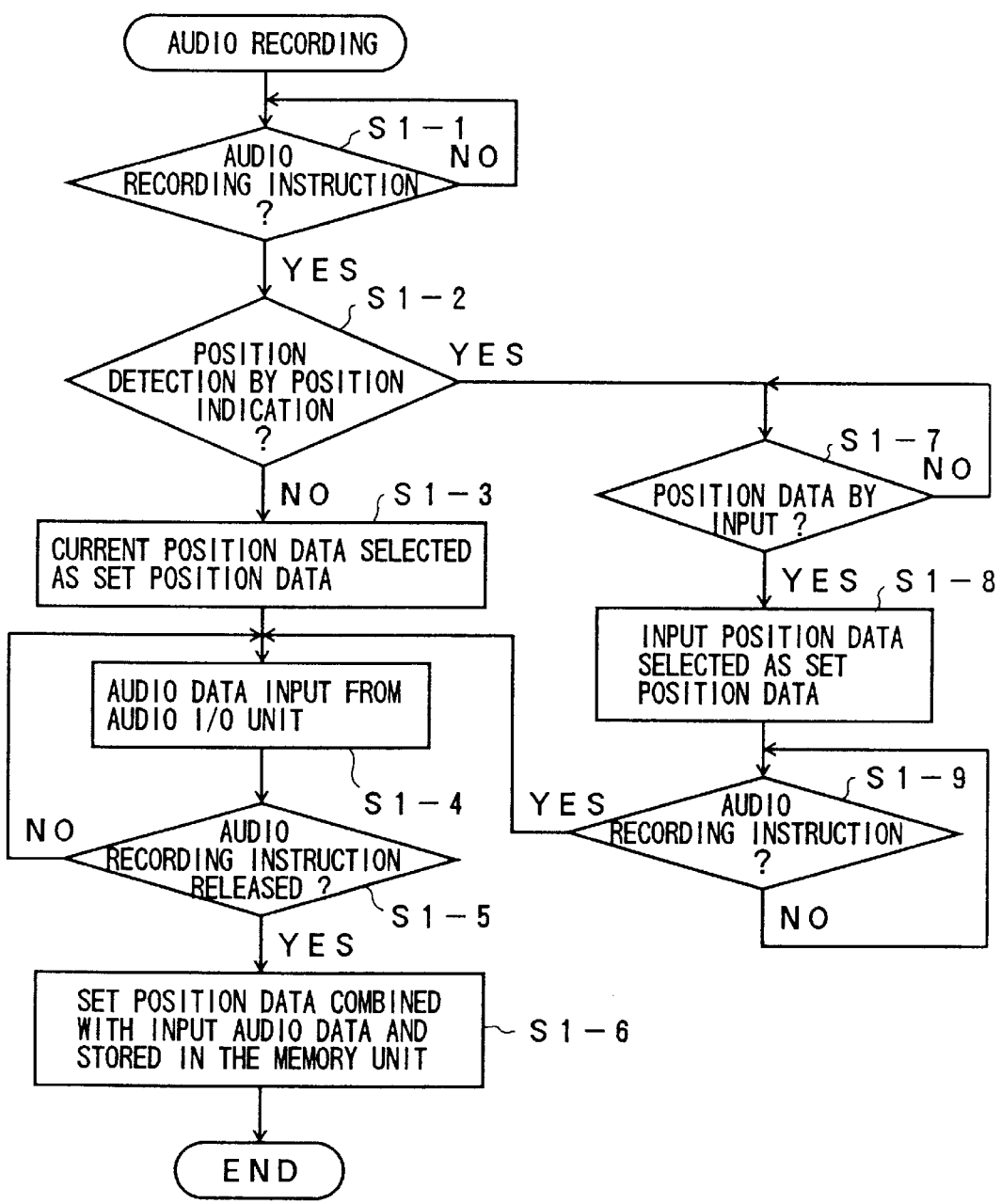
FIG. 2 is a flow chart of an audio recording process of a control unit of an embodiment of the present invention.

FIG. 2 is a flow chart of an audio recording process of the control unit 6 of the present embodiment. In a step S1-1, an audio recording instruction is input from an operating unit 7. In a step S1-2, a set position data detection mode is referenced. It should be noted that the set position data detection mode is set prior to audio recording instruction. Where the present position as measured by the GPS unit 2 is selected as the set position in step S1-2, the position data calculated by the GPS unit 2 based on the signals relayed from the plurality of orbiting GPS satellites is read in as the set position data in a step S1-3. In a step S1-4, the audio data input from the audio input/output unit 3 is read in. Input of audio data from the audio input/output unit 3 continues until the audio recording instruction of the operating unit 7 is released in a step S1-5. When the audio recording instruction of the operating unit 7 is released in step S1-5, the position data read from the GPS unit 2 in step S1-3 is combined with the audio data read from the audio input/output unit 3 in step S1-4 and stored in the memory unit 4 in a step S1-6.

It should be noted that by using the operating unit 7 the user can input position data. When the position data selected as the set position is selected in accordance with instructions input from the operating unit 7 by the user in a step S1-7, the position data input is read in as set position data in a step 1-8.

When an audio recording instruction is again input from the operating unit 7 the process reverts to step S1-4 and the audio data input from the audio input/output unit 3 is read in until the audio recording instruction of the operating unit 7 is released. When the audio recording instruction of the operating unit 7 is released, the position data read from the operating unit 7 in step S1-8 is combined with the audio data read from the audio input/output unit 3 in step S1-4 and stored in the memory unit 4 in step 1-6.

The above-described audio storage process shown in FIG. 2 combines and stores audio data and position data in the memory unit 4.

Figure 3:
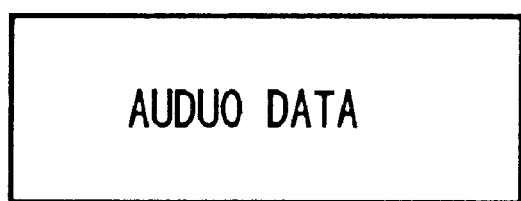
FIG. 3 is a diagram of the composition of the audio data of an embodiment of the present invention.
Figure 3:
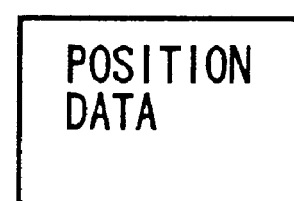
Figure 3:
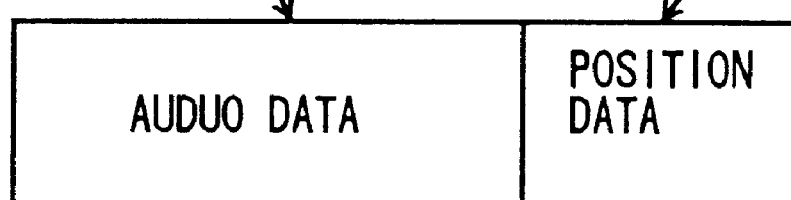

FIG. 3 is a diagram of the composition of the audio data of the present embodiment. (A) represents the audio data input from the audio input/output unit 3, (B) represents the position data obtained either from the measurement results of the position detector 12 or the position data obtained by operation of the operating unit 7 and (C) represents the data stored in the memory unit 4.

As shown in FIG. 3. only audio data is input from the audio input/output unit 3 and only position data is obtained from either the measurement results of the position detector or the operation of the operating unit 7.

When audio data is stored in the memory unit 4, the control unit 6 adds the position data (B) obtained from either the measurement results of the position detector or the operation of the operating unit 7 to the audio data (A) input from the audio input/output unit 3 and stores it in a form shown as (C) in FIG. 3.

When audio data is reproduced, the audio data is read out and reproduced in accordance with the position data attached to the audio data.

Figure 4:
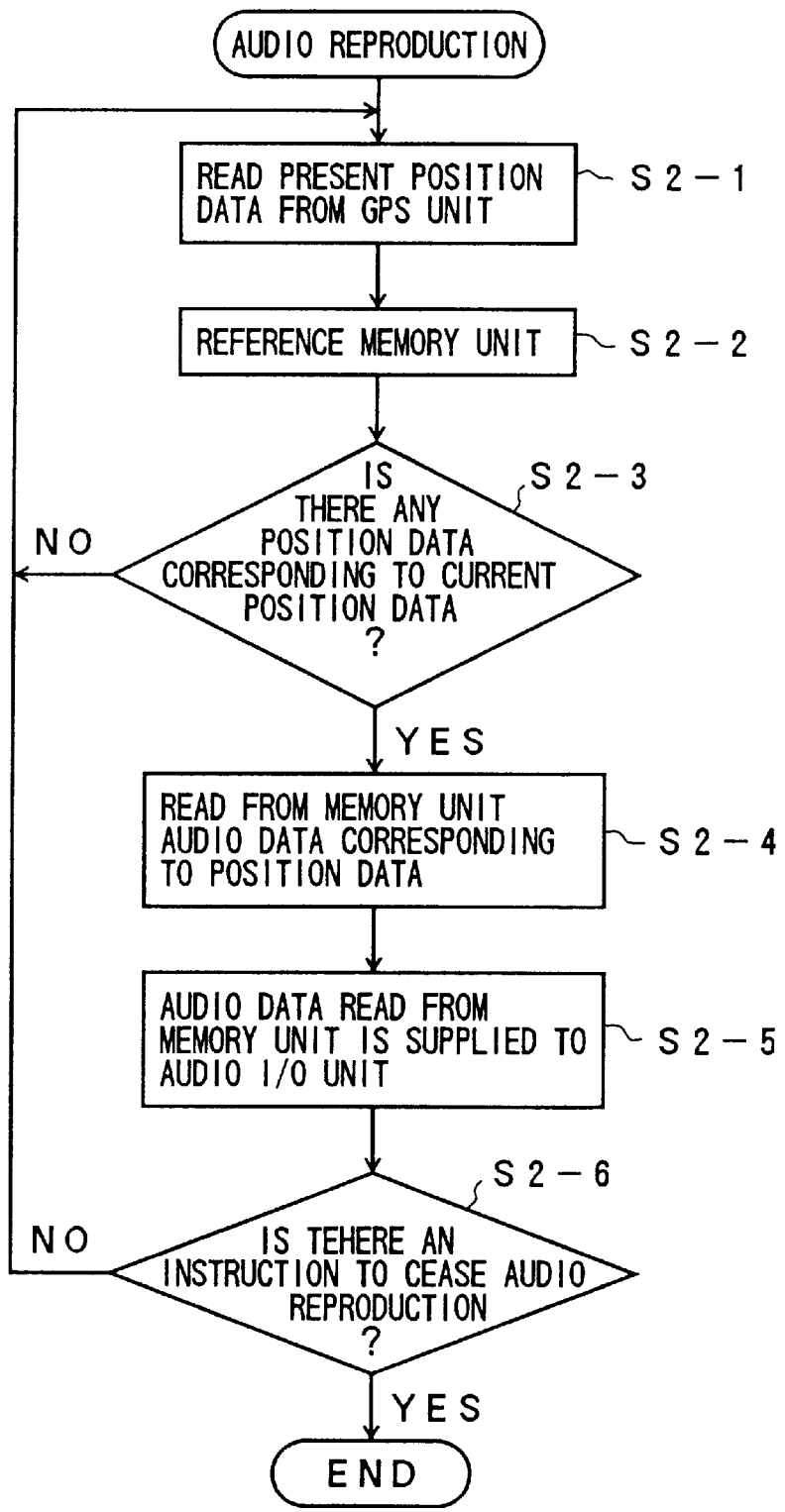
FIG. 4 is a flow chart of an audio reproduction process of a control unit of an embodiment of the present invention.

FIG. 4 is a flow chart of an audio reproduction process of the control unit 6 of the present embodiment. In a step S2-1, the control unit 6 regularly reads position data from the GPS unit 2. In a step S2-2, the control unit 6 searches the memory unit 4 for position data corresponding to the position data read out from the GPS unit 2.

Based on the results of the search conducted in step S2-2, the control unit 6 may find position data corresponding to the position data read from the GPS unit 2 residing in the memory unit 4 in a step S2-3 and, if so, in a step S2-4 reads out the audio data to which position data corresponding to the memory unit 4 is attached and supplies said audio data to the audio input/output unit 3 in a step S2-5.

By repeating steps S2-1 through S2-5 as described above to arrive at a predetermined position in a step S2-6, the previously set audio data is reproduced and essential information pertaining to each position is obtained by audio.

It should be noted that in step S2-3 the determination of correspondence between the position data read from the GPS unit 2 and the position data stored in the memory unit 4 may be made not just on the basis of a perfect match but also on the basis of a partial match, that is, a match within a previously set and predetermined range of the position data read from the GPS unit 2. Accordingly, information can be obtained from audio data when approaching the vicinity of a target position.

The position recognition device 1 of the present embodiment may also be attached to a personal computer or other external device through the data input/output unit 10, making it possible to record and reproduce audio data by displaying positions on a map.

Figure 5:
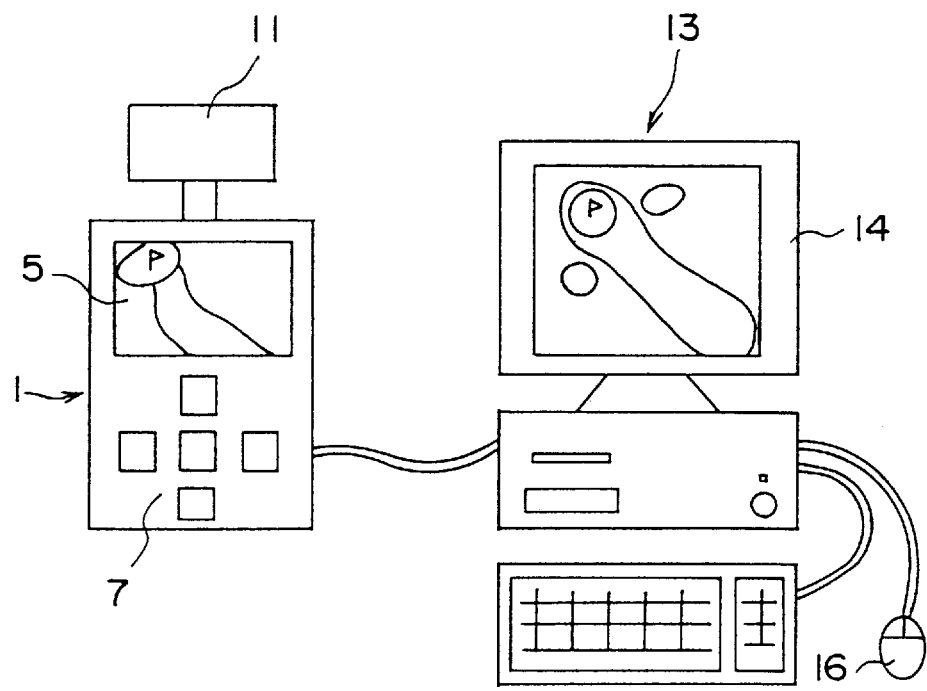
FIG. 5 is a diagram for explaining an example of another application of the embodiment of the present invention.

FIG. 5 is a diagram for explaining an example of another application of the embodiment of the present invention. The data input/output unit 10 of the position recognition device 1 is connected to a personal computer 13 via a PCMCIA card or a serial port RS232C cable connector.

The audio data and position data stored in the memory unit 4 of the position recognition device 1 is supplied to the personal computer 13 via the data input/output unit 10. If map software is installed on the personal computer 13, for example, then a map will be displayed on the display unit 14 and a symbol will be displayed on the map displayed on the display unit 14 at the position of the position data combined with the audio data stored in the memory unit 4 of the position recognition device 1.

Figure 6:
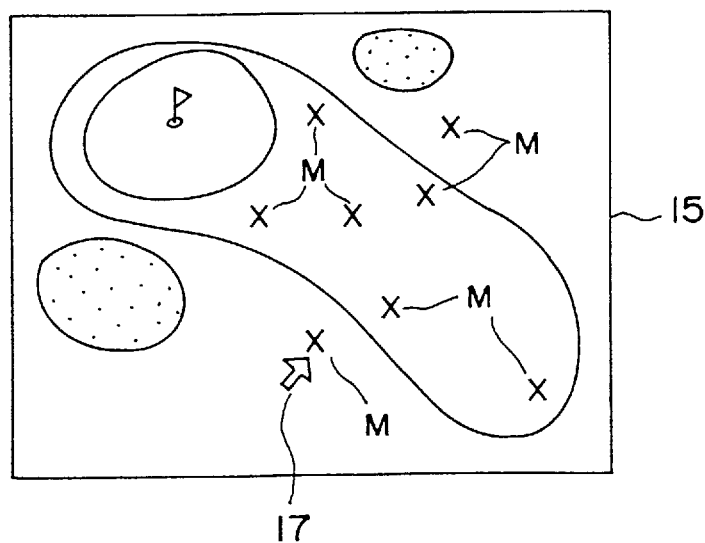
FIG. 6 is a diagram for explaining an example of another application of the embodiment of the present invention.

FIG. 6 is a diagram for explaining an example of another application of the embodiment of the present invention.

As shown in FIG. 6, a map is displayed on the screen 15 of the display unit 14 of the personal computer 13 and positions for which audio data is stored are marked on the map by the letter "M".

The personal computer 13 is operated by a mouse 16. Using the mouse 16 to position the cursor 17 on the marked positions and then clicking the mouse 16 initializes audio reproduction software and the corresponding audio data is reproduced. By reproducing audio at marked positions it is possible to recognize recorded data at marked positions by audio.

Additionally, by setting the cursor 17 at desired locations on the map displayed on the screen 15, marking the locations with the letter "M" and inputting audio, position data of selected positions is combined with inputted audio data and stored. Accordingly, it is possible to use a personal computer 13 to display a map and to set audio data for desired locations specified on the map. Accordingly, by transmitting the audio data to which position data has been combined with the position recognition device 1 and storing it in the memory unit 4, it is possible to store desired audio data.

By using a personal computer 13 as described above, it is possible to store and to reproduce audio data with ease.

Additionally, it should be noted that the position recognition device 1 according to the present embodiment can, for example, be used as a golf or other course guide. That is, storing in memory by audio the distance to the cup from each location of the ball, for example, will aid in selecting the appropriate club and the appropriate shot.

Additionally, by carrying the position recognition device 1 of the present embodiment on hiking trips and the like, storing by audio information as necessary and making memos at each stop, it is possible later to check the location at which the memos were taken and to check the memos according to position by referring to a map. Additionally, the audio is reproduced automatically when that location is next visited, making it possible to check the memo.

Further, by using the position recognition device 1 as a car navigation system it is possible to make a personal audio guide with ease.

It should be noted that, by using a Differential GPS with the GPS unit 2, positions can be corrected by differential data and positions can be measured accurately, thus making it possible to accurately select positions for recording and reproducing audio data.

The above description is provided in order to enable any person skilled in the art to make and use the invention and sets forth the best mode contemplated by the inventors of carrying out their invention. The present a invention is not limited to the specifically disclosed embodiments and variations, and modifications may be made without departing from the scope of the present invention.

The present application is based on Japanese priority application No.10-49729 filed on Mar. 2, 1998, the entire contents of which are hereby incorporated by reference.

What is claimed is:

1. A position recognition device comprising:

means for imputting position data;

means for inputting audio data;

means for recording data, wherein the means for recording data together records the audio data input by the means for inputting audio data and the position data input by the means for inputting position data onto a recording medium that does not comprise an optical disk.

2. The position recognition device as claimed in claim 1, wherein the means for inputting position data comprises means for detecting a present position.

3. The position recognition device as claimed in claim 2, wherein the means for detecting position comprises a GPS system.

4. The position recognition device as claimed in claim 2, wherein the means for recording data records present position data detected by the means for detecting position together with the audio data when the audio data is input by the means for inputting audio data.

5. The position recognition device as claimed in claim 2, further comprising means for reproducing audio data when present position data detected by the means for detecting position matches the position data recorded together with the audio data by the means for recording data.

6. The position recognition device as claimed in claim 1, wherein the means for inputting position data comprises means for displaying the position data.

* * * * *